(12) United States Patent
Zhou

(10) Patent No.: US 6,371,308 B1
(45) Date of Patent: Apr. 16, 2002

(54) MULTIPLE STATIONARY SLUDGE DRAW-OFF TUBES IN CLARIFIERS

(76) Inventor: Siping Zhou, 7724 35th N.E., Seattle, WA (US) 98115

( * ) Notice: Subject to any disclaimer, the term of this patent is extended or adjusted under 35 U.S.C. 154(b) by 0 days.

(21) Appl. No.: 09/662,601

(22) Filed: Sep. 14, 2000

(51) Int. Cl.$^7$ .............................................. B01D 21/24
(52) U.S. Cl. .................... 210/519; 210/532.1; 210/523; 210/528; 210/533
(58) Field of Search ................................ 210/519, 525, 210/528, 532.1, 533, 536, 540, 523

(56) References Cited

U.S. PATENT DOCUMENTS

| | | | | |
|---|---|---|---|---|
| 1,430,425 A | * | 9/1922 | Widmo | 210/533 |
| 2,179,246 A | * | 11/1939 | Applebaum | 210/533 |
| 2,407,947 A | * | 9/1946 | Butcher | 210/528 |
| 2,781,911 A | * | 2/1957 | Galandak | 210/533 |
| 3,951,816 A | * | 4/1976 | Bascope et al. | 210/519 |
| 4,406,789 A | * | 9/1983 | Brignon | 210/532.1 |
| 5,435,924 A | * | 7/1995 | Albertson | 210/528 |
| 5,552,050 A | * | 9/1996 | Valentin | 210/540 |
| 5,628,903 A | * | 5/1997 | Valentin | 210/540 |

\* cited by examiner

Primary Examiner—Christopher Upton

(57) ABSTRACT

The Multiple Stationary Sludge Draw-Off Tubes consists of multiple sludge collection tubes oriented along the tangential direction at different radii, several sludge transfer tubes going along the radial direction, a central connection ring located on the clarifier center and a sludge suction driving force. At the downstream end of each sludge transport tube, a valve is installed to allow the system to control flows from different sludge transfer tubes. Small orifices are distributed along the tangential direction on the each sludge collection tubes. The sludge on the tank bottom is sucked into sludge collection tubes through many small orifices and transferred in to center collection ring. The sludge draw-off facility described here can be used to cover the entire clarifier tank bottom, thus the sludge can be directly drawn-off from where solids settled rather than be collected to the center hopper and then moved out. The ability to quickly remove settled sludge out of the tank increases the clarifier capacity.

24 Claims, 9 Drawing Sheets

MULTIPLE STATIONARY SLUDGE DRAW-OFF TUBES IN CLARIFIERS

REFERENCES

U.S. Pat. No.:
4,193,877 March, 1980 Lillywhite 210/520
U.S. Pat. No. 5,219,470 June, 1993 Bradley et al. 210/767

FIELD OF INVENTION

Clarifiers are tanks where solids-liquid separation occurs due to gravity. They are used in chemical processing, as well as in nearly every wastewater treatment plant. This invention presents a facility and method for solids (or sludge) collection and withdrawal in clarifiers.

BACKGROUND OF INVENTION

The capacity of a clarifier is highly dependent on the efficiency of sludge draw-off facility. A good design and application of a sludge withdrawal facility should provide fast sludge removal and less sludge dilution to avoid a high sludge blanket, which would harm the effluent quality in clarifiers under high solids loading conditions.

As shown in FIGS. 1 and 2 there are two types of sludge collection and withdrawal facilities, Rotational Sludge Scrapers and Rotational Sludge Suction Tubes.

The conventional sludge scraper system consists of rake arms attached with several sludge collection blades with an attack angle between blade axis and rake arm, rake arm driver and a sludge withdrawal hopper around the center column. In recent years, the sludge withdrawal hopper occasionally replaced by Sludge Collection Box (U.S. Pat. No. 5,219,470). The rake arm extends from center column to clarifier side-wall and is able to rotate. The combination of the force due to the rotation of rake arm (along the tangential direction) with the friction between sludge and blade results in the momentum driving the sludge toward the center hopper, where the sludge is removed out of the tank. The shape of the blade used for picking up the sludge is commonly flat or spiral.

In the system of sludge suction tubes, the rotational rake arms are extended from center column to clarifier side-wall and attached with several sludge suction tubes. The suction heads (upstream ends of suction tube) are evenly distributed along the rake arms (in the radial direction). The rake arms together with suction heads rotate along the tank bottom. The downstream ends of suction tube are connected into two separated return sludge boxes normally rectangular in shape, which are typically hung on both sides of a rotatable cage surrounding the influent column. There are many alternatives and applications for the connection between the sludge suction tubes and the suction driving force (usually a pump), such as Rotational Center Well (U.S. Pat. No. 4,193,877) and Sludge Collection Box (U.S. Pat. No. 5,219,470).

Another similar system to the sludge suction tubes described above is called "Unitube" or "Tow-Bro", which consists of a rotatable rectangular (or circular) shaped pipe and a manifold around the center column. Many small suction orifices are distributed along the pipe, which is normally constructed in plate steel for structure stability and extended from clarifier center to side-wall. The rotatable pipe is of tapered design with the cross-section decreasing from the center of the tank to the outer tip for a uniform sludge withdrawal. The "Unitube" rotates to cover entire tank bottom in a certain period.

Using currently available sludge draw-off facilities, either sludge has to be transferred to the withdrawal point (center sludge hopper or sludge collection box) or withdrawal points (suction heads attached on rake arms or suction tubes) have to be rotated to approach the sludge. In both cases, there is significant distance between sludge and withdrawal points.

SUMMARY OF INVENTION

Major Structure and Working Principle of Multiple Stationary Sludge Draw-Off Tubes The Multiple Stationary Sludge Draw-Off Tubes (MSSDOTs) consists of the following 4 major components:

1. Multiple Sludge Collection Tubes—As shown in FIG. 3, several sludge collection tubes are located in the tangential direction at different radii in a circular clarifier. The cross section of each sludge collection tube could be any shape (most likely circular, square or rectangular, etc.). In square clarifiers, the inner sludge collection tubes still can form circular rings but the outer sludge collection tubes should go along the side-wall direction to cover the four corner areas. In principle, as the radius of a clarifier increases, more sludge collection tubes are needed. The sludge collection tubes could be directly laid on the clarifier bottom or also could be laid in gutters on the bottom. Small orifices are distributed along the tangential direction on each sludge collection tube (see FIGS. 4 and 5). The size of small orifices and the distance between two orifices along the tangential direction could be varied to allow flows through the orifices into the collection tube to be more evenly distributed. The orientation of these orifices should always be toward the majority of sludge inventory near the tank bottom.

2. Multiple Sludge Transfer Tubes—As shown in FIGS. 4 and 5, on each sludge collection tube, several sludge transfer tubes (most likely 4) located along the tank's radial direction, are used to connect one sludge collection tube with the center connection ring. In a case with 4 sludge transfer tubes, the angle between two adjacent sludge transfer tubes is 90 degrees (see FIG. 4). In normal operation, the return sludge flow from each sludge collection tube should be evenly distributed among all of sludge transfer tubes. At the downstream end of each sludge transport tube, a valve should be installed to provide the system with the ability to control flows from different sludge transfer tubes. By utilizing the valves and pipe lines mentioned above, the entire sludge return flow of the clarifier could be withdrawn through a single sludge transfer tube to flush out any possible blockages in any part of the piping system.

3. Center Connection Ring—a central connection ring located on clarifier center (at any level in clarifier or underneath clarifier depending on design of return activated sludge flow pumping system) is used to assemble all of sludge transfer tubes together at the upstream end of the ring. The downstream end of central connection ring is connected with the sludge withdrawal pump as shown in FIGS. 4 and 5.

4. Sludge Withdrawal Driving Force—A sludge withdrawal pump connected with the downstream end of central collection ring can be used to provide the driving force of sludge withdrawal. The driven force of sludge removal flow can also be provided by the hydraulic head differences between the water surface in clarifier and the sludge transport system that is used to transfer sludge from the secondary clarifier back to the aeration tanks.

This invention also includes a simplified MSSDOTs, which only uses multiple stationary sludge transfer tubes as shown in FIG. 8. In this case the small orifices for sludge suction are distributed on the wall of sludge transfer tubes along the tank's radial direction.

Comparison of MSSDOTs with Conventional Sludge Collection and Removing Facilities In circular clarifiers (or square) using sludge collection scrapers together with conventional center sludge withdrawal hopper or sludge removing box [Bradley, et al (1993), U.S. Pat. No. 5,219,470], the length of each rake arm attached with several scraper blades extends from the clarifier center to the side-wall in order to collect sludge along the entire clarifier radius. The average sludge transfer distance picking up and pushing toward the tank center by scraper blades is half of the clarifier radius.

Using Multiple Stationary Sludge Draw-Off Tubes to replace a conventional center sludge withdrawal hopper or sludge removing box in circular (or square) clarifiers with sludge collection scrapers, the average sludge transfer distance can be reduced from half the clarifier radius to the distance between two collection tubes. The sludge can be directly drawn-off from where solids are settled rather than be transferred to the center hopper and then moved out. Therefore, the sludge transport speed in clarifiers with MSSDOTs is much faster than that in clarifiers with a center sludge withdrawal hopper or a sludge removing box. Thus, clarifier capacity could be significantly increased.

In many existing secondary clarifiers the rotation sludge suction tubes or Unitube sludge removers (Tow-Bro) are applied. In those clarifiers with sludge suction tubes, the rotation rake arms with several sludge tubes attached on each of the arms are rotated along the tangential direction. In the design of Tow-Bro, one or two rotation sludge withdrawal pipes extend from the center of the clarifier to the side-wall. On the rotational sludge withdrawal pipes many small sludge suction orifices are distributed along the pipe axis. Both the rotational sludge suction tubes and Tow-Bro are able to evenly distribute the sludge draw-off flows thus avoid significantly sludge dilution along the clarifier's radial direction. However, in the square (or circular) clarifiers with both existing rotational sludge collection and removing facilities, sludge draw-off flows along the tangential direction are unevenly distributed. All of sludge flow is withdrawn within a very narrow strip where the suction arms are fixed. Using this type of sludge withdrawal equipment, significant flow convection along the tangential direction is generated due to the flow compensation from the sections with no sludge withdrawal into the sludge withdrawal section.

In addition to the problems of a rotational sludge collection or suction system mentioned above, the high tip speed due to the rake arm (or Tow-Bro) rotation could often disturb and re-suspend the settled sludge near clarifier side-wall.

Using MSSDOTs to replace rotation rake arms with suction tubes (or Tow-Bro), the sludge withdrawal occurs in the tangential direction at all times, not just when the rake arm passes by. Therefore, uniformly distributed sludge removal can be achieved on both clarifier radial and tangential directions, which provides the higher sludge draw-off efficiency (thus lower sludge inventory in the tank) and lower disturbance on the flow regime in the clarifiers.

DETAILED DESCRIPTION

Figure 1:
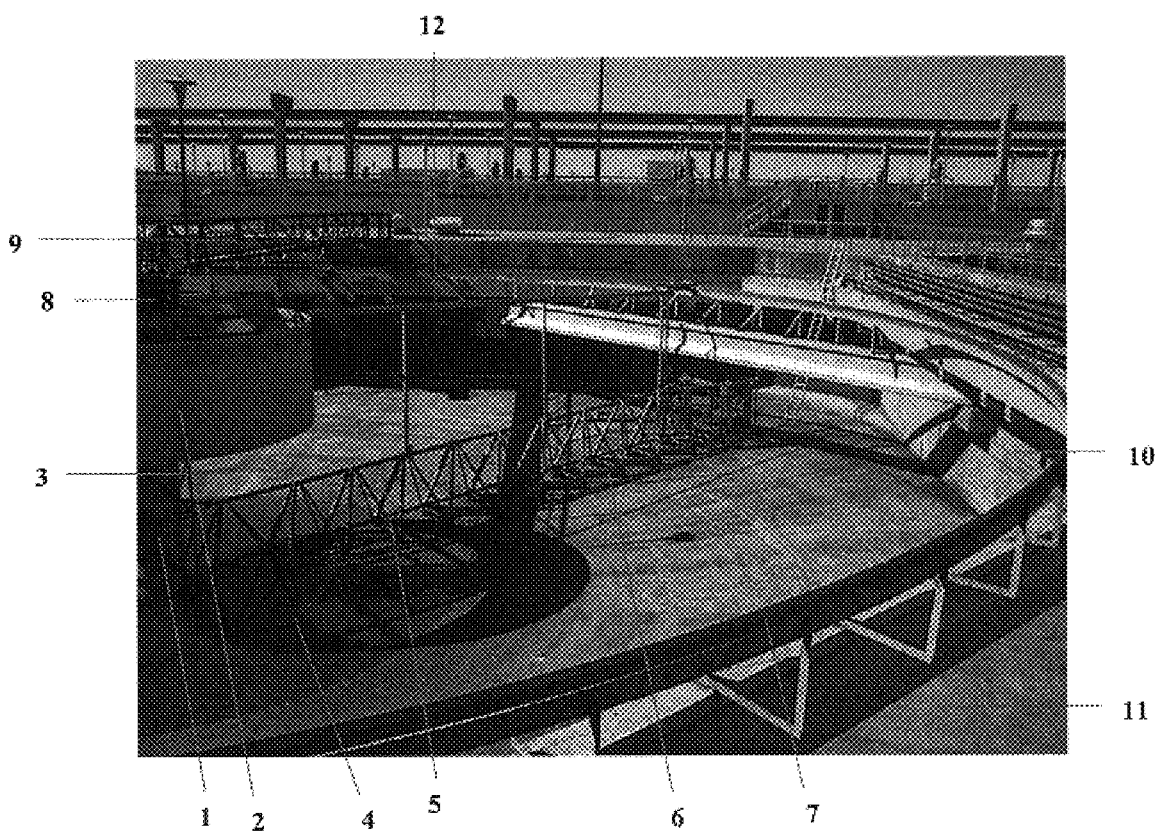
FIG. 1 is a photograph showing a clarifier equipped with a center influent column and rotational sludge scrapers.

FIG. 1 shows a typical clarifier with a center influent column [1] equipped with rotational sludge scrapers. A flocculation well [2] surrounds the center influent column [1] to provide better mixing of clarifier influent liquid. The clarifier tank has a normally inclined tank bottom [11] of concrete or metal construction. A peripheral effluent launder [7] (or weir not shown) is provided to collect clarifier effluent. In normal clarifier operation the liquid level is slightly above the top of effluent launder [7]. A stationary access bridge structure [9] is extended from the top of the tank side-wall [10] to a center drive base [8] on the top of the center influent column [1]. On the top of the center drive base [8], a conventional drive unit including a motor and gears (not shown) are installed. The gears of the driving unit are connected with a depending cage [3]. The cage [3] is connected to the drive unit and extends to a position just above the floor [11] of the tank. The rake arms [5] are connected to a lower portion of the cage [3] and extend radially from the rotational cage [3] generally parallel to the floor [11] of the tank. Scraper blades [6] attached under the rake arms slowly push settled sludge toward clarifier center as the rake arms [5] rotate. The sludge is collected in a sludge hopper [4] or drain sump, which is connected with the open end of the suction pipe for removal of the raked sludge. Near the water surface level a scum baffle [12] is also connected to the rotational rake arm [5].

Figure 2:
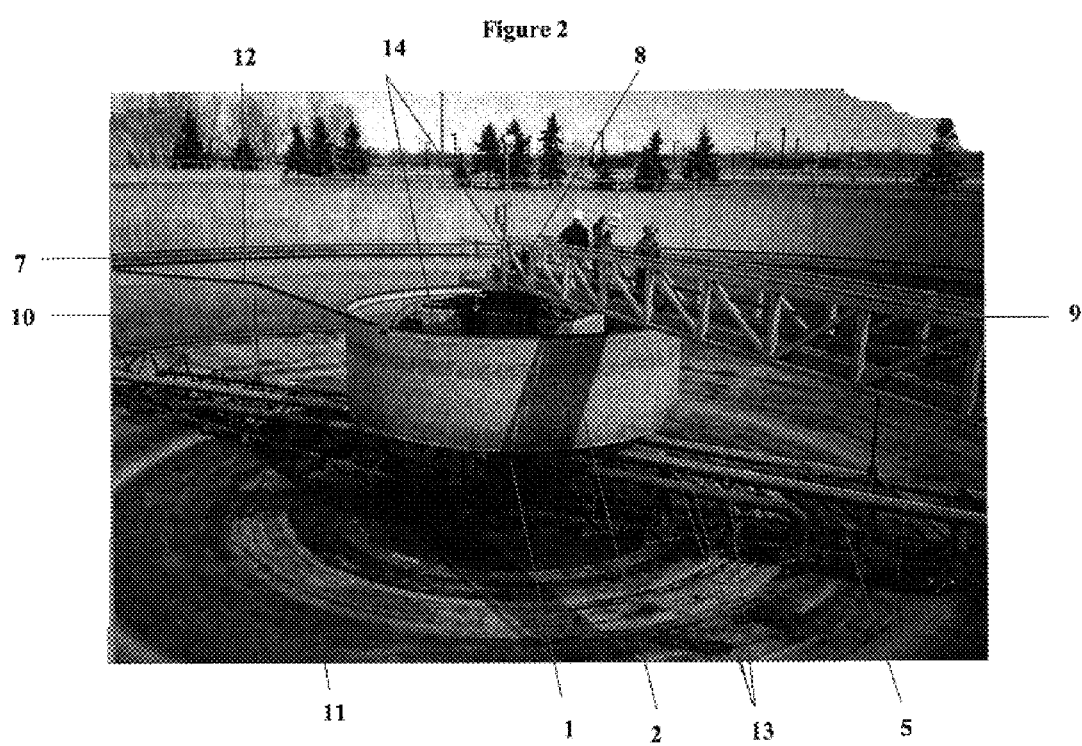
FIG. 2 is a photograph showing a clarifier equipped with conventional rake arms attached with suction tubes.

FIG. 2 shows a circular clarifier equipped with rotational sludge suction tubes [13]. The clarifier center column [1] is installed. A rotational cage surrounds the center column [1]. The top of the cage (not shown) is connected with a driver (not shown) and the lower portion of the cage is connected with rake arms [5]. Two separate sludge collection boxes [14] are attached to the upper portion of the rotational cage. Several sludge draw-off tubes [13] are attached on the rake arms [5]. The upstream ends of suction tube [13] (suction heads) are oriented toward the tank bottom [11] and evenly distributed along the tank radius. The downstream ends of sludge suction tube are separately connected into the two sludge collection boxes (sight wells) [14]. Both of these boxes [14] and sludge rake arms [5] as well as suction tubes [13] simultaneously rotate with the cage. The hydraulic head difference between tank and sludge boxes [14] is the driving force of the sludge suction. The discharge elevation of suction pipe [13] headers in the sludge collection boxes [14] is lower than the water surface in the tank so that sludge is forced up and out of the sludge draw-off tubes [13] by hydraulic action. Sludge flows by gravity from the sludge collection boxes [14] to a manifold (not shown) encircling the bottom of the center-drive cage (not shown) and out under the tank.

Figure 3:
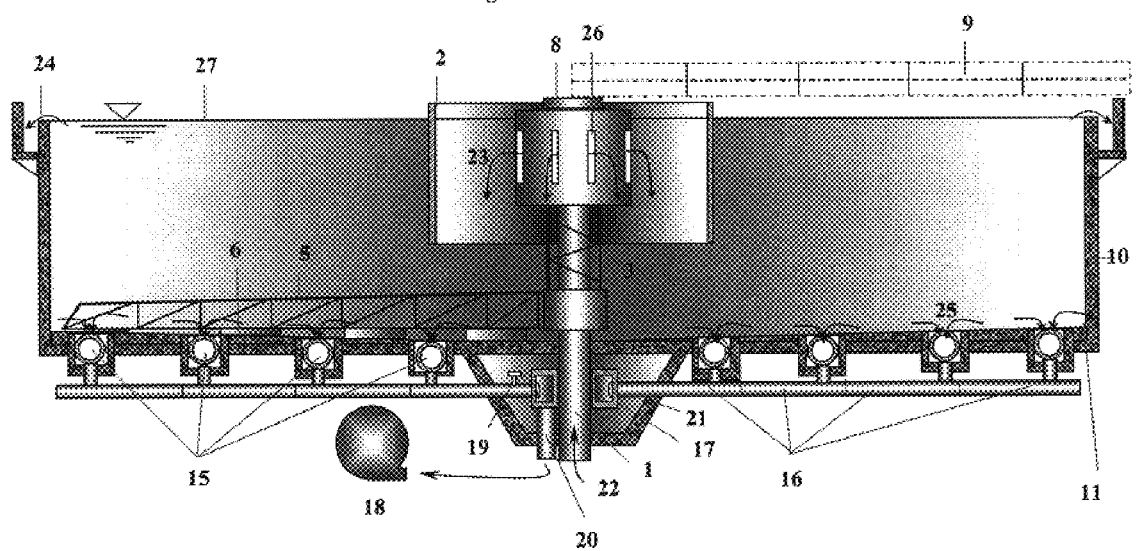
FIG. 3 is a partial cross-section view of a clarifier with the sludge draw-off mechanism of this invention.
Figure 4:
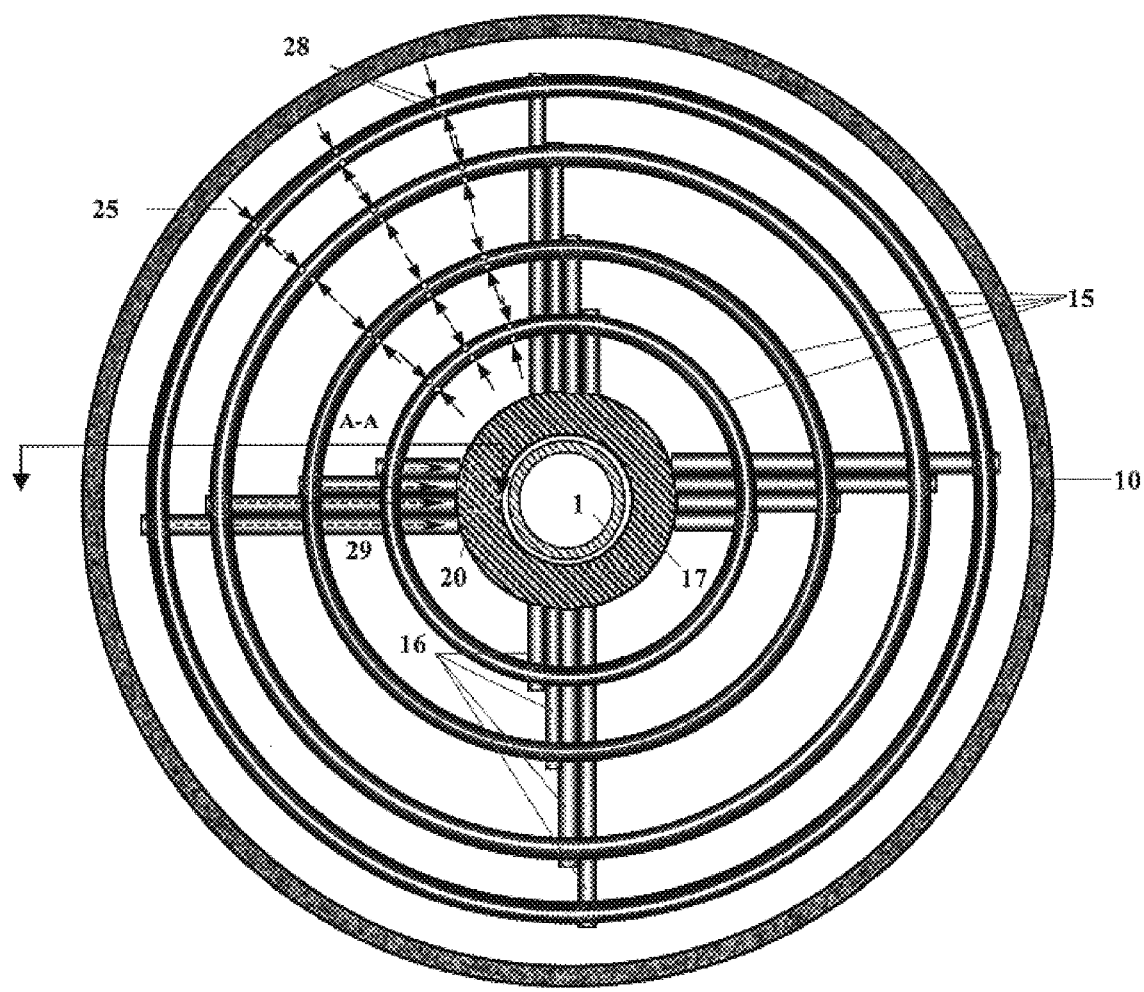
FIG. 4 is a schematic top view of Multiple Stationary Sludge Draw-Off Tubes (MSSDOTs) in Clarifier.

FIG. 3 shows the overall Multiple Stationary Sludge Draw-Off Tubes [15, 16, 17, 18 and 19] in a conventional clarifier tank having a cylindrical side-wall [10] and a slightly inclined tank bottom [11]. The center influent column [1] transports the mixed solid-liquid influent feed [22] into the bottom of the column. The clarifier influent flow [22] enters an influent drum [26] surrounding the upper portion of the center influent column [1]. Inlet slots [23] on the wall of influent drum [26] evenly distribute the influent flow into the clarifier below the liquid level [27]. The clarifier effluent [24] from surface layers goes over the effluent weir [24] while solids are separated from the liquid due to gravity. The sludge inventory on tank floor [11] due to the solids sedimentation is collected and withdrawn by multiple sludge collection tubes [15]. The sludge enters [25] the multiple sludge collection tubes [15] through many small orifices distributed on the tubes. The sludge flow [25] in each collection tube [15] is separately transported through its own sludge transfer tubes [16] into the center connection ring [17]. A valve [19] is installed at the downstream end of each sludge transfer tube [16]) to control the flow distribution in the entire MSSDOTs system. A single connection pipe [20] is used between the center connection ring [17] and return sludge pump [18]. The center connection ring [17], which goes around the lower portion of center influent column [1], downstream ends of multiple sludge transfer tubes [16], and the valves [19] on each tube can be located in a center chamber [21] underneath the tank floor [11]. To further enhance the efficiency of sludge collection and withdrawal facility, this invention could also be combined together with conventional rotational rake arm [5] and blades [6]. FIG. 4 shows a top view of Multiple Stationary Sludge Draw-Off Tubes in a circular clarifier tank. The multiple sludge collection tubes [15] are laid out along the tangential direction at different radii. In principle, as the radius of a clarifier increases, more sludge collection tubes are needed. Small orifices [28] are distributed along the tangential direction on each sludge collection tube [15]. The size of small orifices 28 and the distance between two orifices [28] along the tangential direction could be varied to allow sludge flows [25] through the orifices into the collection tube [15] to be more evenly distributed. Under each sludge collection tube [15] four sludge transfer tubes [16], which go along the tank's radial direction, are used to connect one sludge collection tube [15] (upstream end) with the center connection ring [17] (downstream end). The sludge flows [29] in individual sludge transfer tubes [16], each connected to a single sludge collection tube [15].

Figure 5:
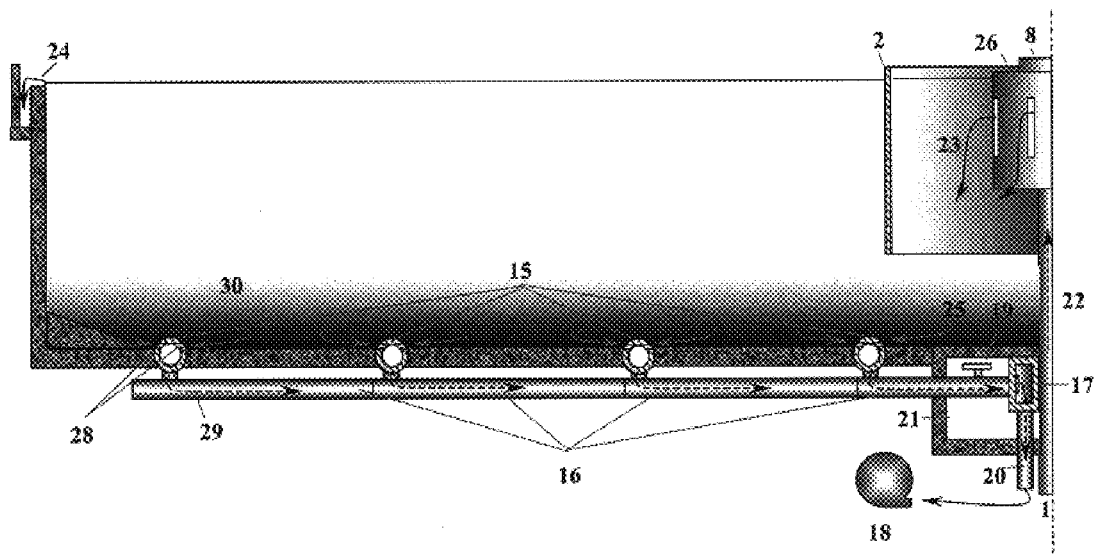
FIG. 5 is a side-view of Multiple Stationary Sludge Draw-Off Tubes (MSSDOTs) taken on the line A—A of FIG. 4.

FIG. 5 is a side view along A—A section in FIG. 4. It shows the detailed connections among multiple sludge collection tubes [ 15], multiple sludge transfer tubes [16], center connection ring [17] and sludge withdrawal pump. The MSSDOTs system is submerged under the sludge blanket [30]. The sludge flows [29] from each sludge collection tube [15] are separately transferred into center connection ring [17]. The valves [19] on each sludge transfer tube can be used to control flow through any part of MSSDOTs to perform different operational functions. The MSSDOTs system described in FIGS. 3, 4 and 5 is normally used in a new clarifier tank in which the center chamber [21] and the gutters on the tank floor (for installation of sludge collection tubes [15] and sludge transfer tubes [16]) can be accommodated during the tank construction period.

Figure 6:
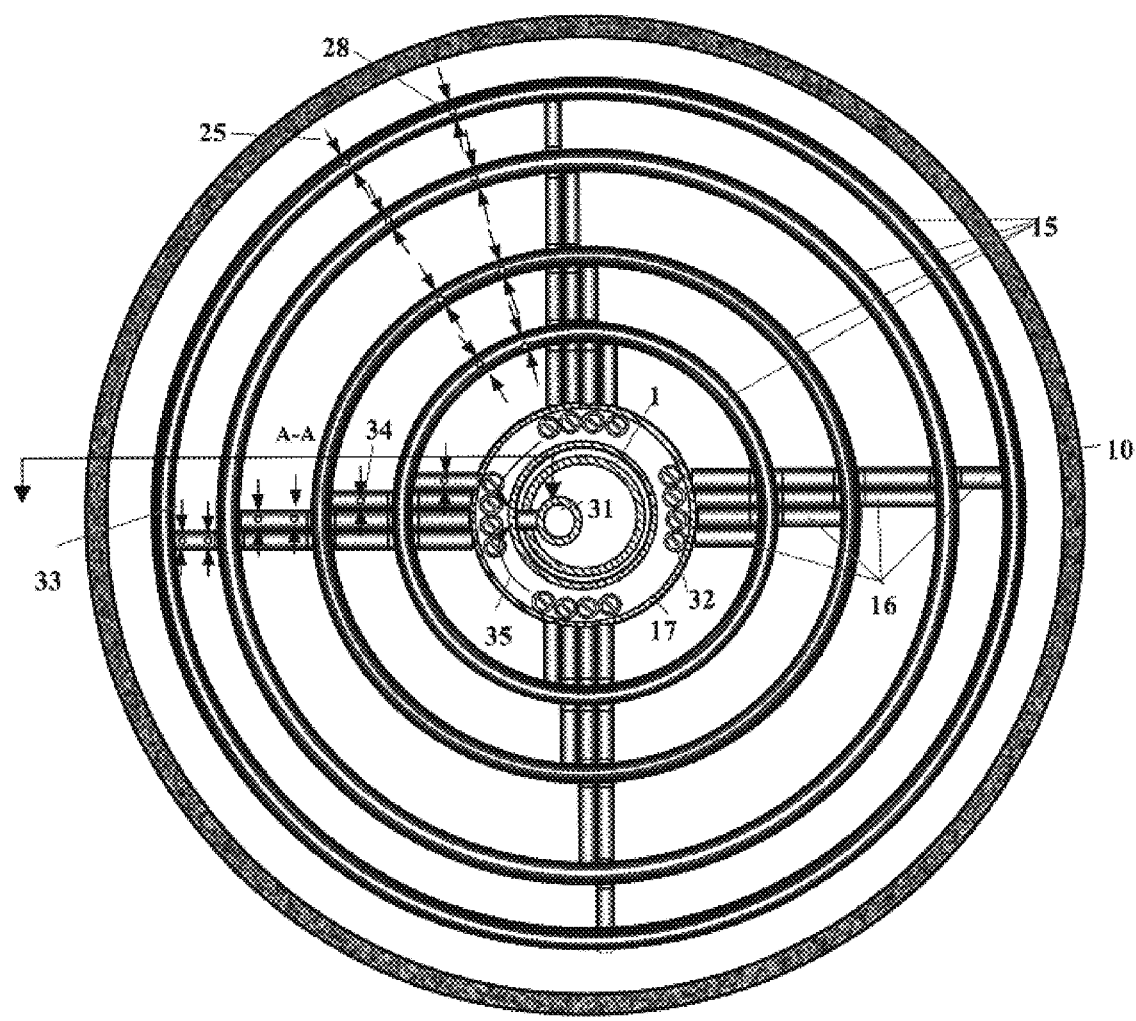
FIG. 6 is a schematic top view of an alternative of this invention.

FIG. 6 is a top view for an alternative of this invention. Besides the orifices [28] on multiple sludge collection tubes, suction orifices [34] are also distributed on the sludge transfer tubes [16], which are laid out and connected with sludge collection tubes at the same level. The MSSDOTs system simultaneously withdrawals sludge flows [25],[33] through orifices [28],[34] on both multiple sludge collection tubes and sludge transfer tubes. A flow control valve [32] is installed at the downstream end of each sludge transfer tube. The sludge flow [35] in center connection ring [17] enters into a vertical sludge pipe [31] located inside of center influent column [1].

Figure 7:
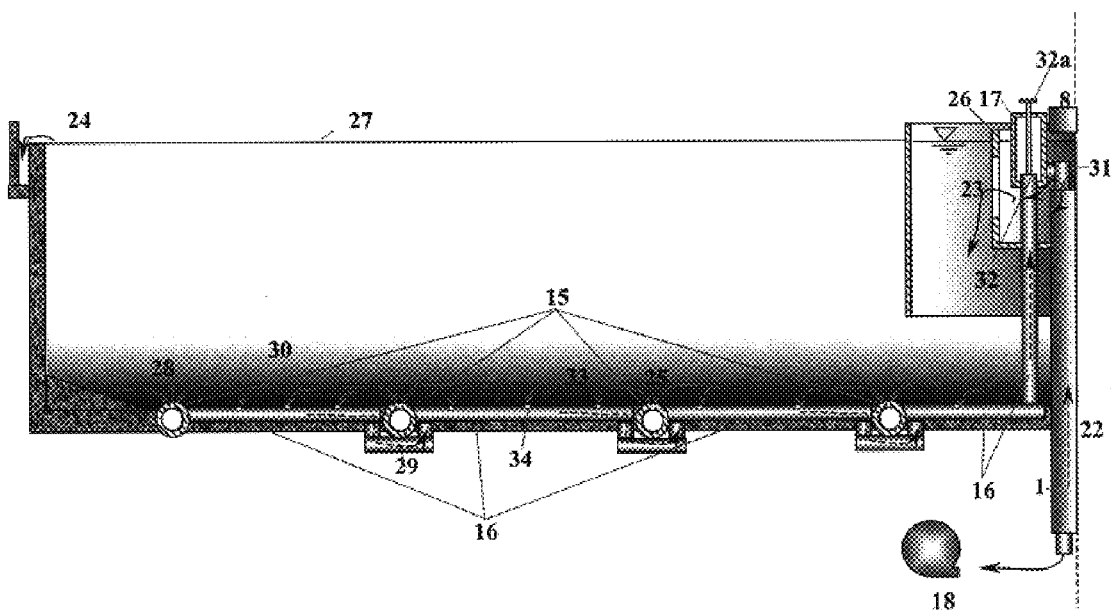
FIG. 7 is a side-view of an alternative of this invention taken on the line A—A of FIG. 6

FIG. 7 shows a side view along A-A section in FIG. 6. There is no center chamber ([21] in FIG. 5) in this alternative. The center connection ring [17] around the center influent column [1] is located inside of the influent drum [26] near the water surface [27]. Beside center influent column [1] the downstream ends of the stationary sludge transfer tube [16] extend upward and connect with the bottom of the center connection ring [ 17]. A vertical sludge withdrawal pipe [31] inside of center influent column [1] extends downward to a sludge pump [18]. An extended control handle [32a] can be used to allow plant operators to operate valves [32] to control flow distribution in the sludge collection system in the cases that auto-valves are not applied. The alternative described in FIG. 6 and 7 is normally used in the modification of exiting clarifiers to minimize the amount of concrete excavation in this case.

Figure 8:
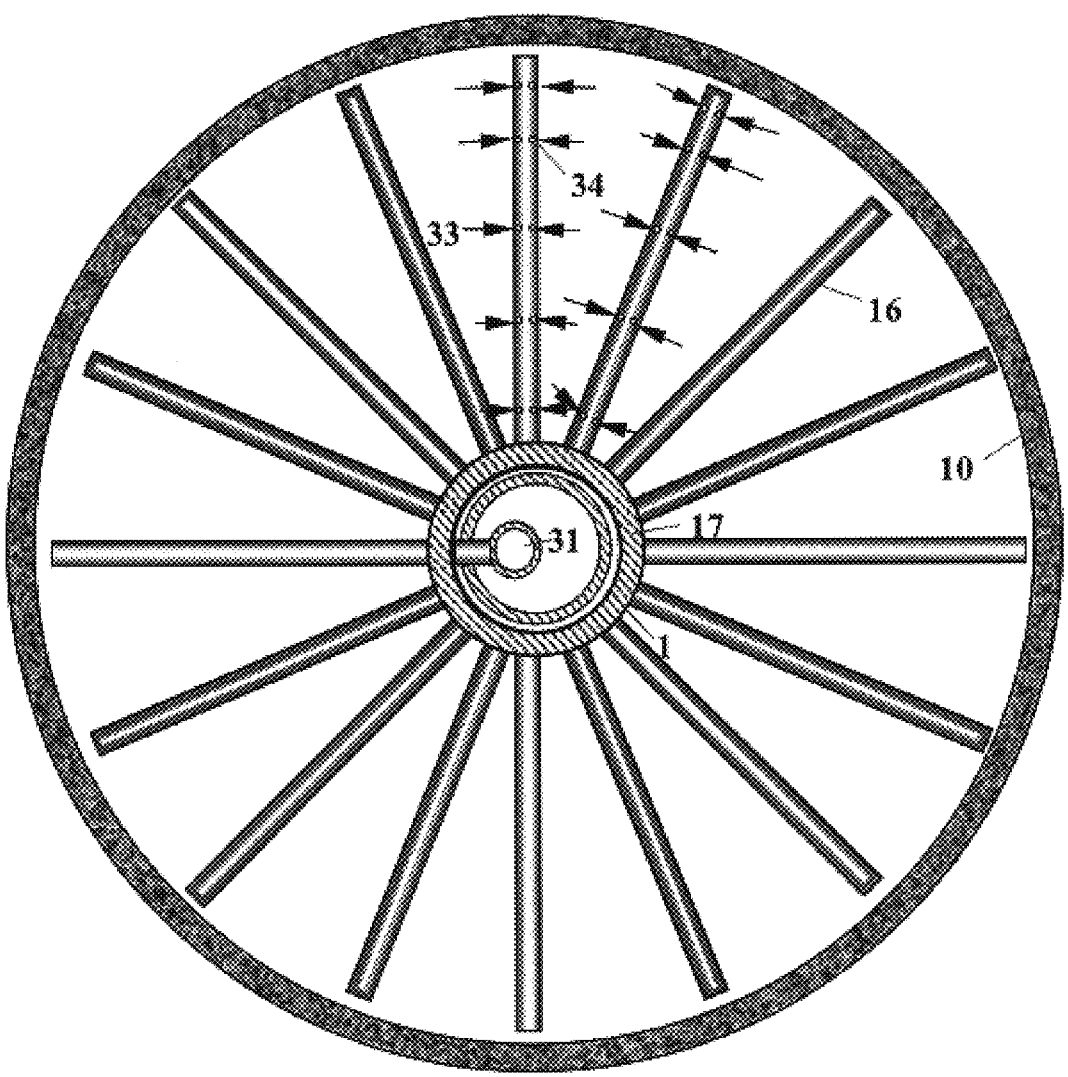
FIG. 8 is a schematic top view of second alternative of this invention.

FIG. 8 shows a top view of the second alternative of this invention. The multiple sludge transfer tubes [16] are evenly distributed along the clarifier tangential direction and extended from a center connection ring [17] to the tank side-wall [10]. In principle, as the radius of a clarifier tank increases, more sludge transfer tubes [16] are needed. There is no stationary sludge collection tube in this alternative. Instead of using sludge collection tubes, the suction orifices [34] are distributed on the sludge transfer tubes [16].

Figure 9:
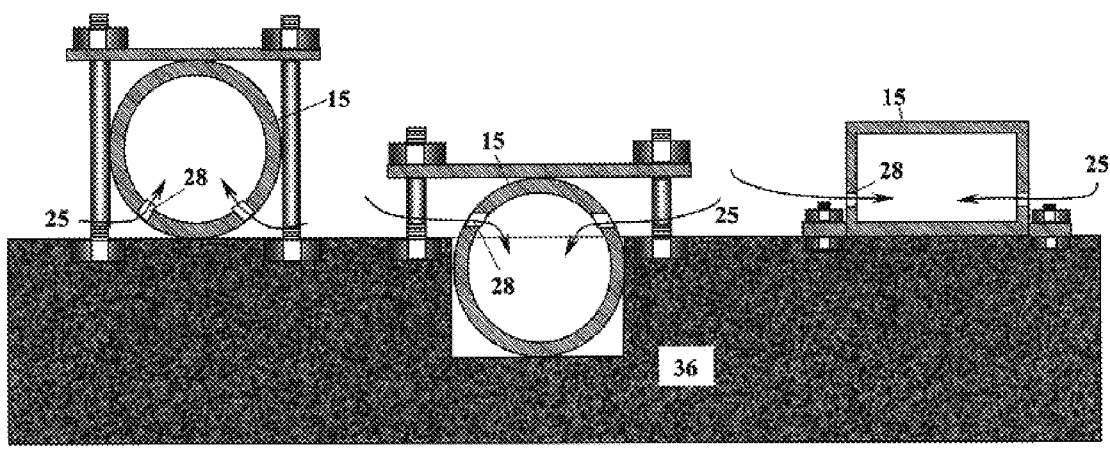
FIG. 9 shows the installation positions of sludge collection tubes used in MSSDOTs

FIG. 9 shows the multiple sludge collection tubes [15] could be either bolted on the tank floor or in the gutters [36]. The cross section of the sludge collection tubes [15] could be any shape (most likely circular or rectangular). The sludge flow [25] enters the sludge collection tubes [15] through the suction orifices [28]. The orifice [28] position should be very close to the clarifier tank floor where the bottom of sludge blanket is located. The orientation of the orifices [28] should point toward the majority of sludge inventory and avoid short circuiting flow from upper layers of low solids concentration.

What is claimed is:
1. A sludge clarifying device, comprising
a clarifier tank having a center influent column to input a sludge-containing fluid, a side wall and a tank floor to contain the sludge-containing fluid;
a plurality of stationary sludge collection tubes disposed on the tank floor beneath the sludge-containing fluid and concentrically arranged with respect to a central point in the clarifier tank, the plurality of stationary sludge collection tubes being located at different radial distances from the central point and having a plurality of orifices for receiving an input of sludge from the sludge-containing fluid;
a plurality of stationary sludge transfer tubes in fluid connection with at least one of the plurality of stationary sludge collection tubes, the first and second stationary sludge transfer tubes having an upstream portion that receives an input flow of sludge from the plurality of stationary sludge collection tubes and a downstream portion that outputs the flow of sludge;

a connection ring centrally located beneath the tank floor and in fluid connection with the downstream portion of the plurality of stationary sludge transfer tubes to collect the output flow of sludge therefrom, the plurality of stationary sludge transfer tubes being disposed along a plurality of radii extending between the connection ring and the plurality of stationary sludge collection tubes; and a pump in fluid connection with the flow of sludge to urge the flow of sludge through the stationery sludge transfer tubes.

2. The sludge withdrawal system of claim 1 wherein the plurality of sludge transfer tubes are members of a plurality of sets of sludge transfer tubes, each set being in fluid connection with one stationary sludge collection tube and the center connection ring.

3. The sludge withdrawal system of claim 2 wherein the fluid connection between at least one sludge collection tube and the center connecting ring established by at least one set of sludge transfer tubes is independent of at least one other set connected to another sludge collection tube.

4. The sludge withdrawal system of claim 1 further including a plurality of valve assemblies connected to the plurality of stationary sludge transfer tubes to regulate the flow therein, the plurality of valve assemblies being independently controllable to distribute the sludge flow between the plurality of stationary sludge transfer tubes.

5. The sludge withdrawal system of claim 1 wherein the plurality of stationary sludge transfer tubes have a plurality of orifices located along a length thereof.

6. The sludge withdrawal system of claim 1 wherein the pump is configured to urge the flow of sludge through the plurality of stationary sludge transfer tubes toward the connection ring.

7. The sludge withdrawal system of claim 1 further comprising a sludge return pipe configured to receive a portion of the flow of sludge from the connection ring and return the portion of sludge to an aeration tank.

8. The sludge clarifier system of claim 1 wherein the plurality of stationary sludge collection tubes are located in a gutter on the tank floor.

9. The sludge clarifier system of claim 1 wherein the plurality of stationary sludge collection tubes are attached to the tank floor by bolts.

10. A sludge withdrawal system, comprising
a clarifier tank having a side wall and a tank floor to contain a sludge-containing fluid;
a plurality of stationary sludge collection tubes disposed on the tank floor beneath the sludge-containing fluid and concentrically arranged with respect to a central point in the clarifier tank, the plurality of stationary sludge collection tubes being located at different radial distances from the central point and having at least one orifice for receiving an input of sludge from the sludge-containing fluid,
a plurality of stationary sludge transport tubes in fluid connection with at least one of the plurality of stationary sludge collection tubes, the plurality of stationary sludge transfer tubes having an upstream portion that receives an input flow of sludge from the plurality of stationary sludge collection tubes and a downstream portion that outputs the flow of sludge; and
a connection ring that receives the flow of sludge from the plurality of stationary sludge transfer tubes, the plurality of stationary sludge transfer tubes being disposed along a plurality of radii extending between the connection ring and at least one stationary sludge collection tube.

11. A sludge withdrawal system, comprising
a clarifier tank having a side wall and a tank floor to contain a sludge-containing fluid;
a plurality of stationary sludge collection tubes disposed on the tank floor beneath the sludge-containing fluid and concentrically arranged with respect to a central point in the clarifier tank, the plurality of stationary sludge collection tubes being located at different radial distances from the central point and having at least one orifice for receiving an input of sludge from the sludge-containing fluid,
a plurality of stationary sludge transport tubes in fluid connection with at least one of the plurality of stationary sludge collection tubes, the plurality of stationary sludge transfer tubes having an upstream portion that receives an input flow of sludge from the plurality of stationary sludge collection tubes and a downstream portion that outputs the flow of sludge;
a plurality of valve assemblies connected to the plurality of stationary sludge transfer tubes to regulate the flow therein, the plurality of valve assemblies being independently controllable to distribute the sludge flow between the plurality of stationary sludge transport tubes.

12. The sludge withdrawal system of claim 11 further including a connection ring that receives the flow of sludge from the plurality of stationary sludge transfer tubes, the plurality of stationary sludge transfer tubes being disposed along a plurality of radii extending between the connection ring and at least one stationary sludge collection tube.

13. The sludge withdrawal system of claim 11 wherein the plurality of stationary sludge transfer tubes have an orifice for receiving an input of sludge from the sludge-containing fluid.

14. The sludge withdrawal system of claim 11 wherein the plurality of stationary sludge transfer tubes have a plurality of orifices located along a length thereof for receiving an-input of sludge from the sludge-containing fluid.

15. The sludge withdrawal system of claim 11 wherein the plurality of stationary sludge collection tubes have a plurality of orifices located along a length thereof.

16. The sludge withdrawal system of claim 11 wherein the plurality of stationary sludge collection tubes and the plurality of stationary sludge transfer tubes each have a plurality of orifices located along a length thereof.

17. The sludge withdrawal system of claim 11 further including a pump configured to urge the flow of sludge through the plurality of stationary sludge transfer tubes.

18. The sludge withdrawal system of claim 11 further including a sludge return pipe configured to receive a portion of the flow of sludge and return the portion of sludge to an aeration tank.

19. The sludge withdrawal system of claim 11 further including a center influent column located in the center of the clarifier tank for inputting the sludge-containing fluid into the clarifier tank.

20. The sludge withdrawal system of claim 11 wherein the plurality of stationary sludge transfer are configured in a plurality of sets, each set being comprised of a subplurality of sludge transfer tubes in fluid connection with one stationary sludge collection tube.

21. The sludge withdrawal system of claim 11 wherein the plurality of stationary sludge collection tubes are located in a gutter on the tank floor.

22. The sludge withdrawal system of claim 11 wherein the plurality of stationary sludge collection tubes are attached to the tank floor by bolts.

23. A sludge withdrawal system, comprising a clarifier tank having a side wall and a tank floor to contain a sludge-containing fluid;

a plurality of stationary sludge transfer tubes disposed on the tank floor along a plurality of radii extending from a central connection ring toward the side wall of the tank, each of the plurality of stationary sludge transfer tubes having an upstream region having an orifice that receives an input of sludge from the sludge-containing fluid, and a downstream end that outputs a flow of sludge toward the central connection ring, and a plurality of valve assemblies connected to the plurality of stationary sludge transfer tubes to regulate the flow therein, each of the plurality of valve assemblies being independently controllable to distribute the sludge flow between the plurality of stationary sludge transport tubes.

24. The sludge withdrawal system of claim 23 further including a pump configured to urge the flow of sludge through the plurality of stationary sludge transfer tubes.

* * * * *